April 28, 1931. J. L. DOUGHTIE 1,802,412
PEANUT TREATING MACHINE
Filed Dec. 30, 1929 4 Sheets-Sheet 2

Inventor
Joseph Lee
Doughtie
By
Attorney

April 28, 1931. J. L. DOUGHTIE 1,802,412
PEANUT TREATING MACHINE
Filed Dec. 30, 1929 4 Sheets-Sheet 3
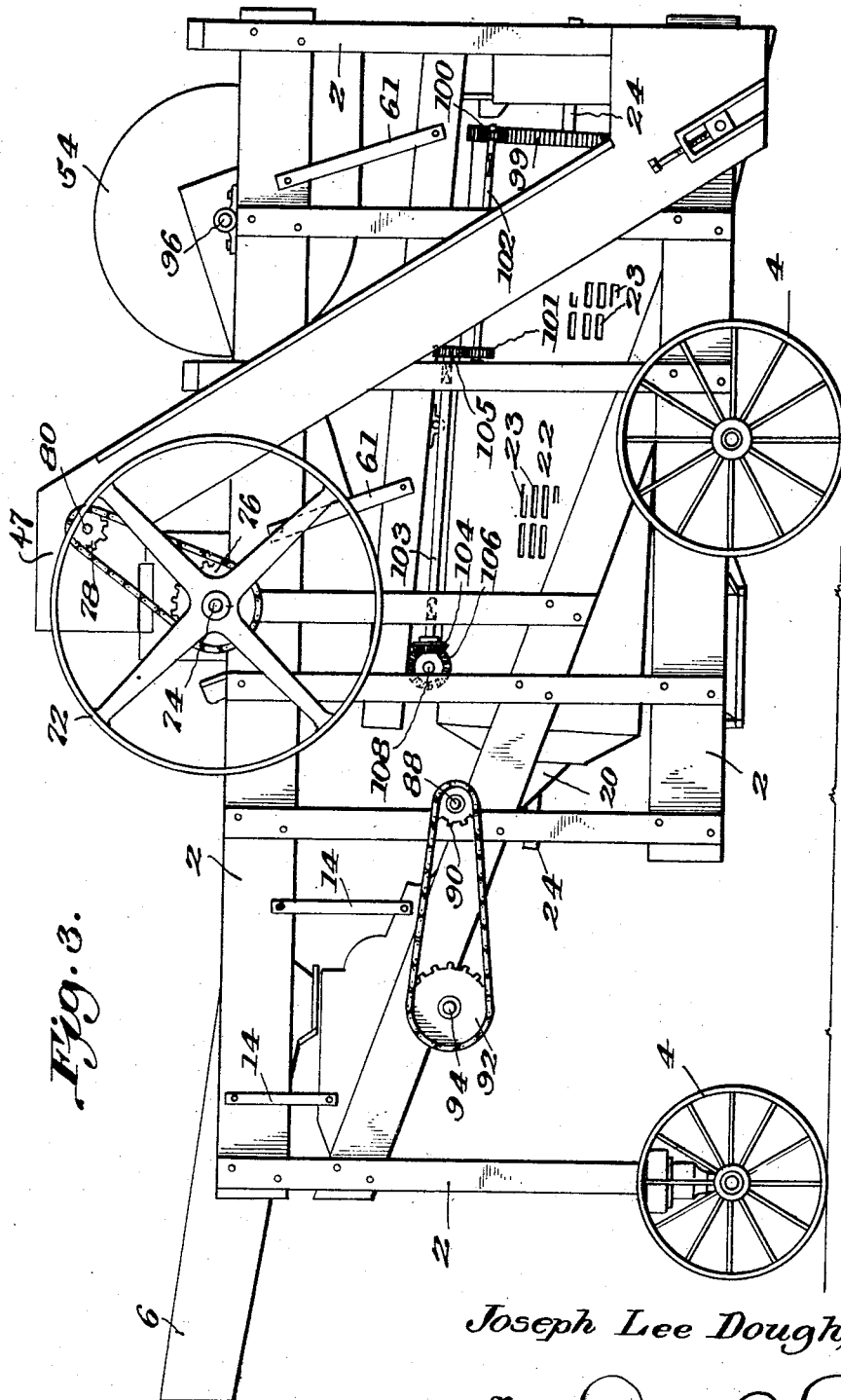
Fig. 3.
Inventor
Joseph Lee Doughtie
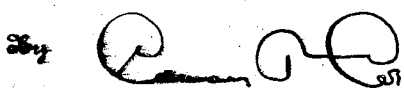
Attorney Joseph Lee Doughtie, Inventor Patented Apr. 28, 1931

1,802,412

UNITED STATES PATENT OFFICE

JOSEPH LEE DOUGHTIE, OF FRANKLIN, VIRGINIA

PEANUT TREATING MACHINE

Application filed December 30, 1929. Serial No. 417,491.

This invention relates to a portable machine for preparing peanuts for seed purposes. More particularly it relates to a portable machine for preparing peanuts for seed purposes by stemming the peanuts, cleaning and grading the peanuts in the shell as to size, for shelling the peanuts, and for grading the shelled peas as to size.

Machines for handling peanuts are by no means new. There have long been machines which shell the peanuts. Some of these machines were combined with winnowing devices which separated the peas from the broken shell pieces as the nuts fell from the sheller. Such machines were stationary and performed only the one function. They could only treat peanuts already stemmed and did not grade the peanuts before or after the shelling operation.

Such machines were improved by the addition of graders for the peas after shelling.

Among other peanut handling machines well known for some time are the machines which separate the peanuts from the vines— that is, remove vines and the small stems. After this operation the peanuts would be transported to a machine for shelling and grading.

However, it was still necessary for the farmer to take his peanuts, vines now detached, to a place where the shelling and grading machine was located. Such a machine was later made portable so as to be transported to the different farms for operation.

The applicant is well aware of improved machines of a portable type which grade and clean the peanuts in the shell, shell them, and then grade the shelled peas as to size, as such machines have been known and used for some years. These machines have many advantages over previous inventions. Still they have disadvantages which could be remedied by proper invention.

In the first place such machines do not remove the stems from the peanuts and prepare them for the operations to follow. The stemming operation must be performed either by hand or by a separate machine similar to the type previously mentioned. It is thus clear that before the peanuts can be handled by the portable machine they must be stemmed, and must then be transported to the portable machine for grading and shelling. This added function requires hand labor or an additional separate machine and transportation which is both costly and time taking.

Furthermore, such machines do not appear to be entirely automatic in operation. They require at some point of the operation the handling of the peanuts by hand. Usually such machines employ a conveyor which is positioned on a stand at right angles to the device so as to run the peanuts past hand laborers. The peanuts are carried past the laborers who remove the foreign matter and pick out some of the peanuts and transport them to another part of the machine for further operations. Such conveyors are usually attached to the machine so as to be folded up to the side of the machine when not in use and unfolded into position when the machine is to be used. This makes for clumsiness of structure and necessitates some delay in commencing actual operations after the machine reaches the field.

There has long been an urgent need in the peanut farming business for a machine which is compact in structure and entirely automatic and efficient in operation which can be transported from farm to farm and which on reaching a farm is accessible for immediate operation, and which separates the peanuts from the stems, grades and cleans them in the shells, shells them, separates the foreign matter and broken shell pieces, and then grades the shelled peas or kernels as to size.

It has been found that there is especially a great need for such a machine for the purpose of treating and selecting the largest peanuts, called Jumbos, for seed use. In this connection the double grading insures the best results. The peanuts after being separated from the stems are graded as to size. The largest are selected and are shelled after which they are again graded. Such a process insures an efficient selection of the largest peas for use as seed, The primary purpose of this invention is to provide a portable machine which fills the need above mentioned, which embodies the features mentioned in a combination, compact in structure, which automatically stems, cleans and grades the peanuts in the shell, shells them, separates the shelled peas from foreign matter and pieces of broken shell, and which then grades as to size the shelled peas.

A further object of this invention is to provide a device of the type mentioned which has its parts so interrelated and positioned as to make it compact in form and substantially small in size and which is readily accessible on reaching the field for handling an exceptionally large quantity of peanuts per day.

Still another object contemplated is to provide a device for preparing peanuts for seed purposes which is entirely automatic in operation and which eliminates all hand labor after the peanuts on the stems are put in the machine. Hand labor such as the removing of foreign matter, or hand selection of the larger nuts, is both slow and expensive and the present invention thus saves the farmer both time and money as it eliminates all hand labor whatsoever.

These and other objects of the invention will become more readily apparent upon a reading of the specification in connection with the accompanying drawings and appended claim.

In the drawings:

Fig. 3 is a right side elevational view showing the framework and driving connections for other of the parts.

Figure 1:
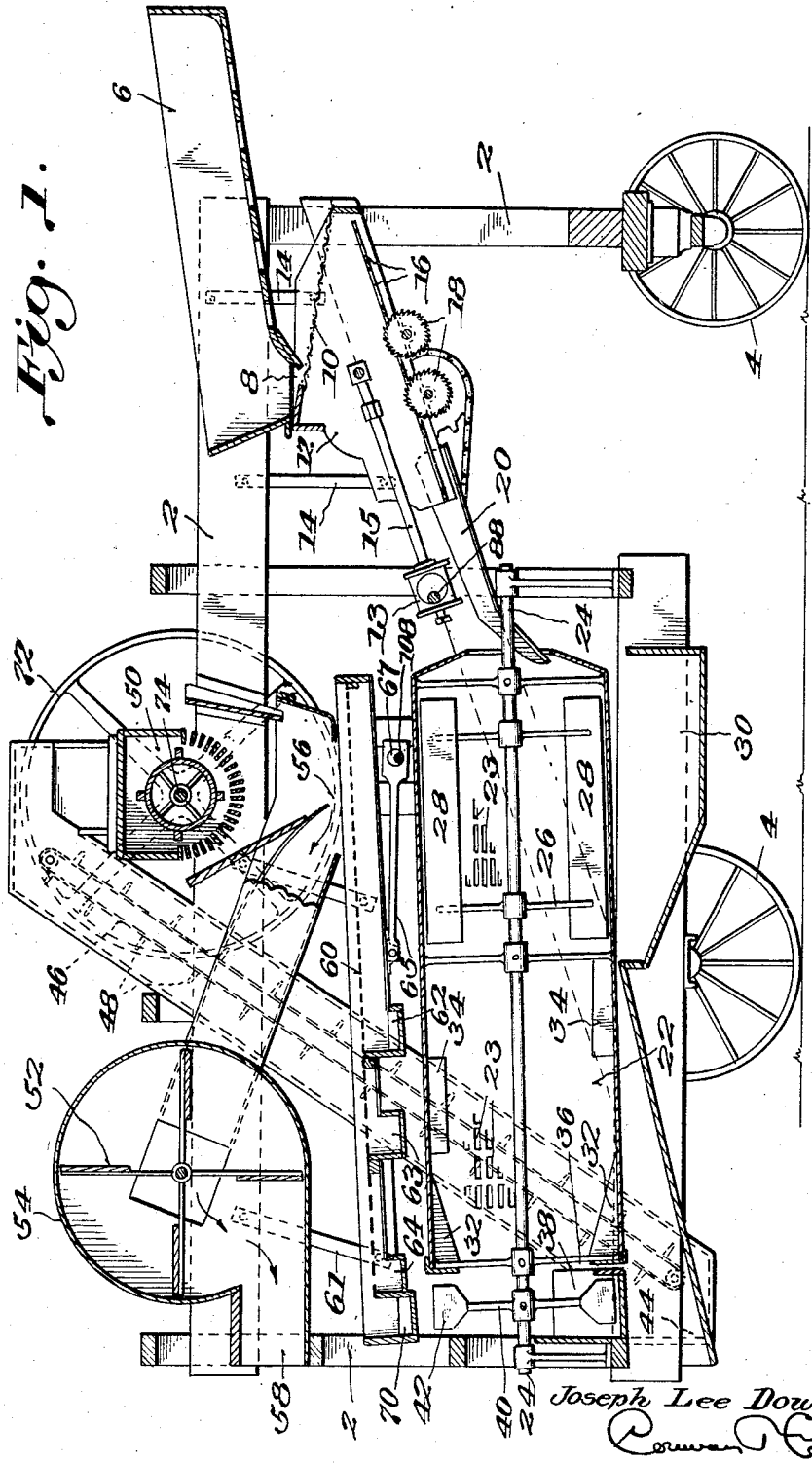
Fig. 1 is a left side elevational view with sections removed to show working parts and the traveled path of the peanuts in passing through the machine.

The device consists of a framework 2 mounted on wheels 4 so as to be portable. Mounted upon this framework in compact arrangement is a stemmer, a cleaner and grader for the peanuts in the shell, a sheller, a conveyor, a fan and suction device, and a grader for the shelled peas as shall now be more particularly described.

Mounted upon the framework is a hopper 6 of the usual type, the bottom of the hopper slanting on an inclined plane. At the lower end of the bottom of said hopper is an opening 8 therein, through which the peanuts with stems and perhaps considerable dirt and foreign matter pass to an agitating screen 10 which has large perforations therein. The screen is attached to a box framework 12 which is loosely attached to the frame 2 by means of bars 14. The box framework 12 is so constructed that its upper surface which is made up of the perforated screen rests in an inclined plane sloping the opposite direction from the bottom of the hopper. The lower part of the box framework 12 forms an inclined plane sloping in the same direction as the hopper bottom but on somewhat a steeper angle. The bottom of the box framework 12 is formed with longitudinal slots 16 through which protrude the blades of the stemmer saws 18.

The box framework 12 is shaken horizontally by the conventional eccentric and pitman 13 and 15, and this shaking knocks off the dirt and foreign matter as the peanuts with stems drop through to the bottom of the box framework 12. The stems are then removed by the stemming saws 18 and the peanuts then pass by action of gravity through the chute 20 into the rotating drum 22. The rotating drum is axeled on the shaft 24, and is positioned slightly on an inclined plane sloping towards the rear of the device.

The casing of the rotating drum is perforated with rectangular longitudinal slots 23. The slots are of two different sizes. Those on the half of drum nearest the chute 20 are $3/8'' \times 3''$. The slots on the other half of the drum casing are $1/2'' \times 2''$. It is not obligatory that the slots should be the exact sizes mentioned—but these dimensions have been found to be the best for selecting peanuts for seed purposes.

Figure 4:
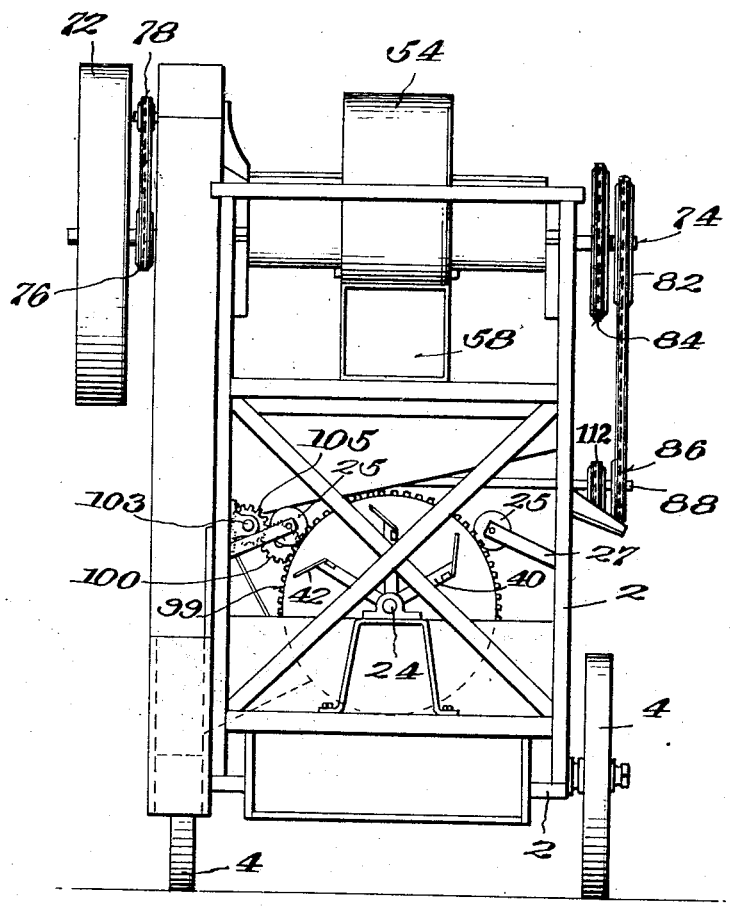
Fig. 4 is a rear elevational view showing in part the manner in which the drum is rotated.

Journalled on shafts parallel to the drum shaft are canvas covered rollers 25 (Fig. 4) which rest against the perforated drum casing. The shafts upon which the rollers rotate are mounted on supports 27 which are attached to the main framework. The purpose of these rollers is to keep the perforations in the drum casing clear, so as to ensure a free passage of the nuts in the drum.

Within the half of the drum having the smaller slots and loosely mounted to the shaft upon which the drum rotates by supporting bars 26 are paddles 28. These paddles give acceleration to the peanuts in the rotating drum, supplying the necessary added force in assisting to free the peanuts from the slots in the drum casing and allowing the small inferior nuts and dirt and foreign matter to pass through the slots in the casing to the receiving box 30.

In the half of the drum having the larger slots and fastened or attached radially of the inside of the casing are steel plates 32 and 34, substantially as shown in Fig. 1. The purpose of these is to force the peanuts through the drum. They so assist in eliminating nuts deposited in the drum that none will remain in the drum if sufficiently operated.

The larger nuts pass from the drum through an opening 36 into the receiving box 38.

Attached to the shaft upon which the drum rotates by supports 40 are six paddles 42 which when the shaft is revolved push the peanuts through an opening in the end of the receiving box into the box 44.

The nuts are then picked up from the box 44 by means of an endless belt conveyor 46 which has lifts or cups 48 and are carried up and dumped into the sheller 50. Both the conveyor and the sheller are conventional in design. The means for transmitting driving power to the conveyor and sheller will be hereinafter described.

As the shelled nuts fall from the sheller they are separated from the broken pieces of shell and other foreign matter by means of a suction arrangement. This suction is caused by a fan 52 enclosed in a chamber 54, said chamber in part extending to a point below the sheller where there is an opening 56. As the shelled nuts and the pieces of shells drop from the sheller the pieces of shells and lighter foreign matter are drawn up by the suction fan into the chamber and then are blown out through an outlet 58.

The shelled nuts separated from the shells fall to the framed screen 60 which is positioned slightly on an inclined plane and is loosely suspended from the framework 2 by supporting bars 61. This screen is shaken by the conventional eccentric and pitman 67 and 65. The screen has three different size perforations or slots. The sectional area of the screen having the smallest perforations (about 1/4" x 1 1/4") is positioned at the end of the screen which first receives the shelled nuts. As the screen is shaken the larger nuts reach the middle section of the screen which has perforations a little larger (about 7/8" x 3/8") finally the larger nuts reach the last section having still larger perforations (about 7/8" x 9/16").

Beneath the various sections of the screen are receiving boxes 62, 63 and 64. Attached to the openings of said receiving boxes are chutes 68 which may be attached to facilitate the removal of the nuts to baskets.

The largest nuts, commonly known as Jumbos, are too large to pass through any of the perforations in the screen. When they reach the end of the screen they fall into a collecting box 70.

The machine is operated by a driving means which will now be described. Power is transmitted to the machine from a power source, such as a tractor, by means of a belt which fits over a band wheel 72 mounted on a shaft 74 which is rotatably mounted on the frame 2.

On the shaft 74 is mounted a sprocket wheel 76 (Fig. 3). The power transmitted to the shaft 74 and sprocket wheel 76 is transmitted by an endless sprocket chain arrangement to the sprocket wheel 78 which is mounted on a shaft 80 which is mounted on the conveyor casing 47. This arrangement drives the conveyor 46.

Figure 2:
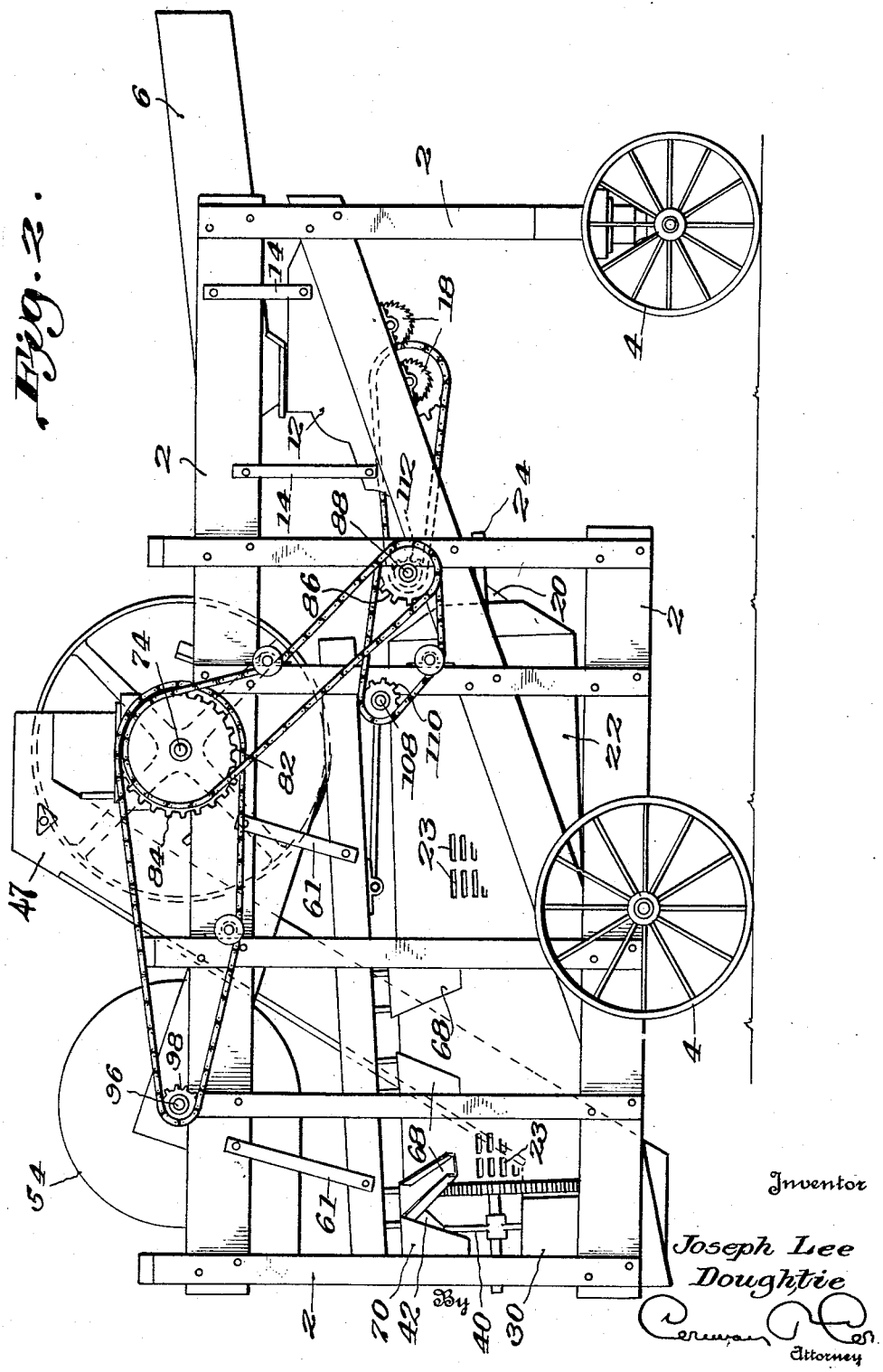
Fig. 2 is a left side elevational view showing the framework and the driving connections for some of the parts.

Mounted on the shaft 74 at the opposite end from the band wheel are two sprocket wheels 82 and 84 (Fig. 2). The power transmitted to the shaft 74 is in turn transmitted to a sprocket wheel 86 mounted on the shaft 88, which is mounted to the frame 2, by means of an endless chain arrangement connecting the sprocket wheels 82 and 86. The shaft 88 also carries the eccentric 13 for shaking the box framework 12.

The sprocket wheel 90 mounted on the shaft 88 (Fig. 3) is connected by chain arrangement to the sprocket wheel 92 mounted on the shaft 94 which transmits movement to the stemming saws 18.

The fan 52 is mounted on the shaft 96. Mounted on the same shaft as the fan is the sprocket wheel 98 which is turned by an endless chain connected with the wheel 84, thus rotating the fan. (Figure 2.)

The rotary drum is driven by means which will now be described. The lower end of the drum is provided with gear teeth 99 positioned on its outer periphery. These gear teeth mesh with the gear teeth of the wheel 100 (Fig. 4) which is mounted on the shaft 102 (Fig. 3). On the other end of the shaft 102 is mounted a gear wheel 101 which meshes with the gear wheel 105 mounted on the shaft 103. On the shaft 103 at the other end thereof is mounted a bevel gear 104 which meshes with the bevel gear 106 mounted on the shaft 108.

The shaft 108 is turned by a chain connecting the sprocket wheel 110 mounted on said shaft and the sprocket wheel 112 (Fig. 4) mounted on the shaft 88. The shaft 88 is rotated by means described above.

The shaft 108 also carries the eccentric 67 for shaking the screen 60.

The connecting means in the above described driving arrangement may consist of belts and belt wheels instead of chains and sprocket wheels.

Having now described my invention, what I claim as new and desire to secure by Letters Patent in the United States is:

In a machine for preparing peanuts for seed purposes, the combination of a framework mounted on wheels, a hopper positioned on the top and at one end of the framework, a stemmer having its bottom on an inclined plane and positioned directly beneath said hopper, a cylindrical drum mounted on a rotatable shaft on said framework and positioned in a slightly inclined plane, said drum having a plurality of perforations of graduated sizes, those at one end of the drum being larger than those at the other end, means for rotating said drum, said drum having openings at each end thereof, a downwardly inclined chute connecting the lower end of the stemmer and the opening at the higher end of the cylindrical drum, a receiving box positioned beneath the opening at the lower end of the drum and to one side thereof, a plurality of paddles mounted on the drum shaft outside the drum at its lower end for pushing the peanuts into the receiving box as they come from said opening, a sheller positioned above the higher end of said drum and to one side thereof, an endless belt conveyor for carrying peanuts from the receiving box to the sheller, a suction fan positioned above the lower end of the drum, a casing surrounding said fan and having an opening directly below said sheller, a screen slightly inclined with its higher end directly below said sheller, and means for reciprocating the screen, said screen having graduated perforations.

In testimony whereof I have hereunto set my signature.

JOSEPH LEE DOUGHTIE.